July 25, 1933.  L. LUNSFORD  1,919,236
WINDSHIELD CLEANER
Filed Oct. 31, 1930
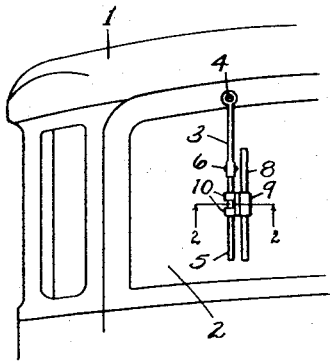
Fig. 1
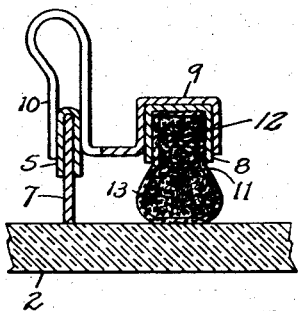
Fig. 2
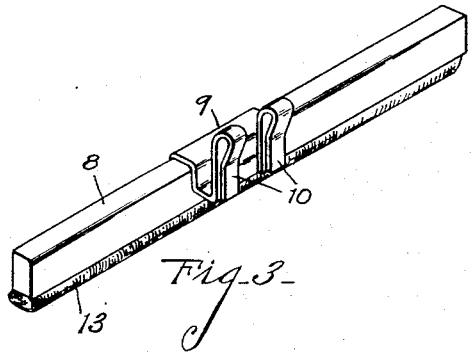
Fig. 3
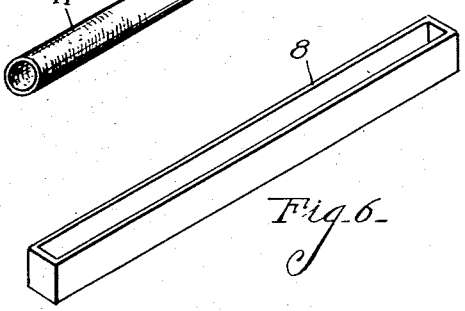
Fig. 5
Fig. 6
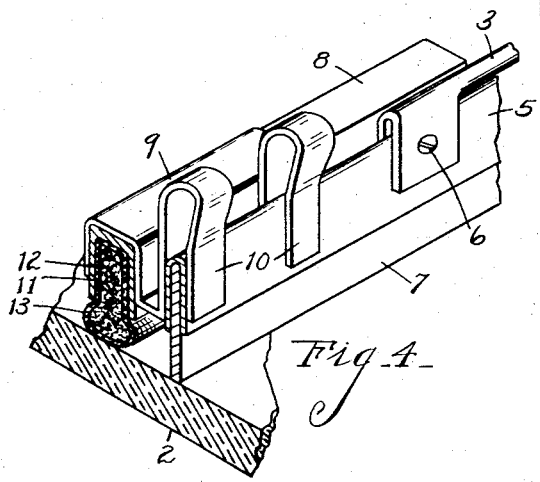
Fig. 4
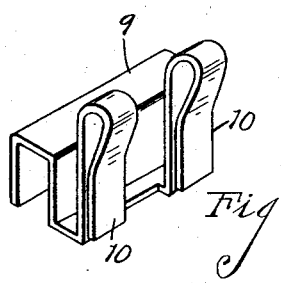
Fig. 7
INVENTOR
Louis Lunsford
BY
Chappell Earl
ATTORNEYS Patented July 25, 1933

1,919,236

UNITED STATES PATENT OFFICE

LOUIS LUNSFORD, OF MUSKEGON, MICHIGAN, ASSIGNOR TO LUNSFORD MANUFACTURING CO., OF MUSKEGON, MICHIGAN, A CORPORATION OF MICHIGAN

WINDSHIELD CLEANER

Application filed October 31, 1930. Serial No. 492,509.

The main object of this invention is to provide a windshield cleaner which is very efficient in removing ice, sleet and snow from windshields and providing for clear vision.

A further object is to provide an attachment for windshields which is adapted for use in connection with numerous makes of windshield wipers of the squeegee type.

Objects pertaining to details and economies of my invention will definitely appear from the description to follow. The invention is defined in the claims.

A structure which embodies the features of my invention is clearly illustrated in the accompanying drawing, in which:

Fig. 1 is a fragmentary front perspective of a motor vehicle with my wiper in operative relation thereon.

Fig. 2 is a fragmentary section on line 2—2 of Fig. 1.

Fig. 3 is a perspective view of the auxiliary wiper holder with the mounting clip thereon.

Fig. 4 is an enlarged fragmentary perspective showing the relation of the auxiliary holder and clip to the wiper blade holder.

Fig. 5 is a section of the salt holding tube.

Fig. 6 is an inverted perspective view of the auxiliary wiper holder.

Fig. 7 is a perspective view of the clip.

In the embodiment illustrated 1 represents a motor vehicle body and 2 the windshield thereof. The supporting arm 3 is pivotally mounted at 4 and is preferably automatically driven, the driving means, however, not being illustrated.

The wiper blade holder 5 is pivotally mounted on the arm at 6 and the wiper blade 7 is preferably of rubber or other suitable flexible material as is commonly used in wipers of this character.

I provide a channel-shaped auxiliary holder 8 with an attaching clip 9 formed as a sheet metal stamping, this attaching clip being of U cross section to adjustably and frictionally engage the holder 8 so that the clip may be adjusted to any desired position thereon, depending on the point of attachment for the arm 3 to the blade holder 5.

The clip 9 has spaced U shaped spring fingers 10 adapted to be adjustably and removably engaged with the holder 5 as clearly shown in Fig. 4.

I provide a tubular conduit 11 for salt or other granular material indicated at 12, this container being a section of knitted seamless tubing. The ends of the tube are closed and it is inserted into the holder 8 with a portion 13 of the tube projecting from the holder and adapted to bear or slide on the windshield at the side of the wiper blade. The holder 8 is preferably of substantially the same length as the blade.

The tube being of knitted fabric is quite porous so that moisture readily penetrates into the salt, dissolving a sufficient quantity thereof so that any ice or snow accumulating on the windshield is readily melted or dissolved. The blade 7 acts to wipe off the excess moisture.

While I prefer to use salt, other granular material which will cause ice or frost to dissolve may be employed. The granular material enclosed in the flexible tube allows the tube to conform effectively to the mounting of the auxiliary holder on the blade holder. The U shaped clips of the blade holder permit the necessary adjustment of the auxiliary holder to blade holders of different character and to secure the desired contact of the conduit 11 with the window, as it will be observed that the spring fingers 10 have a wide range of adjustment on the holder 5.

I have not attempted to illustrate various adaptations and embodiments of my invention as it is believed that this disclosure will enable those skilled in the art to embody or adapt the same as may be desired.

Having thus described my invention what I claim as new and desire to secure by Letters Patent is:

1. An attachment for windshield wipers comprising an anti-freeze holder, and a U shaped spring clip adjustably and frictionally engaging said holder and having spaced integral U shaped spring fingers detachably and adjustably engageable with a windshield wiper blade holder.

2. An attachment for windshield wipers comprising an anti-freeze holder, and a channel-like clip adjustably and frictionally engaging said holder and having a loop-like spring finger detachably and adjustably engageable with a windshield wiper blade holder.

LOUIS LUNSFORD.